United States Patent
Dettori et al.

(10) Patent No.: US 10,146,563 B2
(45) Date of Patent: Dec. 4, 2018

(54) PREDICTIVE LAYER PRE-PROVISIONING IN CONTAINER-BASED VIRTUALIZATION

(71) Applicant: International Business Machines Corporation, Armonk, NY (US)

(72) Inventors: Paolo Dettori, Hartsdale, NY (US); Andrew R. Low, Ontario (CA); Aaron J. Quirk, Cary, NC (US); Seetharami R. Seelam, Chappaqua, NY (US); Michael J. Spreitzer, Croton-On-Hudson, NY (US); Malgorzata Steinder, Leonia, NJ (US); Lin Sun, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 15/227,233

(22) Filed: Aug. 3, 2016

(65) Prior Publication Data

US 2018/0039524 A1  Feb. 8, 2018

(51) Int. Cl.
*G06F 9/455* (2018.01)
*G06F 9/46* (2006.01)
(Continued)

(52) U.S. Cl.
CPC .......... *G06F 9/455* (2013.01); *G06F 9/45533* (2013.01); *G06F 9/45558* (2013.01);
(Continued)

(58) Field of Classification Search
CPC .. G06F 9/455; G06F 9/45533; G06F 9/45558; G06F 2009/4557; G06F 9/48; G06F 9/4843; G06F 9/485; G06F 9/4881; G06F 9/50; G06F 9/5005; G06F 9/5011; G06F 9/5016; G06F 9/5022;
(Continued)

(56) References Cited

U.S. PATENT DOCUMENTS 8,417,798 B2   4/2013   Chen et al.
8,793,684 B2   7/2014   Breitgand et al.
(Continued)

OTHER PUBLICATIONS

Muppidi et al.; "Container Based Parallelization for Faster and Reliable Image Segmentation", 2015.
(Continued)

*Primary Examiner* — Charles M Swift
(74) *Attorney, Agent, or Firm* — Garg Law Firm, PLLC; Rakesh Garg; David M. Quinn

(57) ABSTRACT

Using a metadata of a layer, a prediction factor including a level of participation of the layer in a set of container images is computed. Each container image includes a corresponding set of layers and is usable to configure a container in a container-based virtualized data processing environment. Using a set of levels of participation corresponding to a set of layers, and using a condition in a prediction algorithm, a subset of layers that have to be pre-provisioned at a node is predicted. The subset of layers is adjusted, to form an adjusted subset of layers, by looking ahead at a container requirement of a workload that is planned for processing at a future time. The adjusted subset of layers is caused to be provisioned on the node prior to the future time.

25 Claims, 6 Drawing Sheets

(51) Int. Cl.
*G06F 15/173* (2006.01)
*G06F 9/50* (2006.01)
*G06F 9/48* (2006.01)

(52) U.S. Cl.
CPC ............... *G06F 9/48* (2013.01); *G06F 9/485* (2013.01); *G06F 9/4843* (2013.01); *G06F 9/4881* (2013.01); *G06F 9/50* (2013.01); *G06F 9/505* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5033* (2013.01); *G06F 9/5044* (2013.01); *G06F 9/5055* (2013.01); *G06F 9/5077* (2013.01); *G06F 9/5083* (2013.01); *G06F 2009/4557* (2013.01); *G06F 2209/5019* (2013.01)

(58) Field of Classification Search
CPC ...... G06F 9/5027; G06F 9/5044; G06F 9/505; G06F 9/5055; G06F 9/5083
See application file for complete search history.

(56) References Cited

U.S. PATENT DOCUMENTS

| | | | |
|---|---|---|---|
| 8,909,767 B2 | 12/2014 | Sunkara et al. | |
| 8,930,949 B2 | 1/2015 | Chen et al. | |
| 9,294,347 B2 | 3/2016 | Shetty et al. | |
| 2010/0100877 A1* | 4/2010 | Greene | G06F 9/5011 718/1 |
| 2010/0199285 A1* | 8/2010 | Medovich | G06F 9/45533 718/104 |
| 2013/0091285 A1 | 4/2013 | Devarakonda et al. | |
| 2013/0097601 A1* | 4/2013 | Podvratnik | G06F 9/5027 718/1 |
| 2013/0346969 A1* | 12/2013 | Shanmuganathan | G06F 9/4856 718/1 |
| 2014/0222889 A1* | 8/2014 | Bello | H04L 29/06537 709/202 |
| 2014/0344810 A1* | 11/2014 | Wang | G06F 9/455 718/1 |
| 2015/0067783 A1 | 3/2015 | Pulier et al. | |
| 2015/0149475 A1 | 5/2015 | Nakahira et al. | |
| 2015/0309828 A1* | 10/2015 | Shaik | G06F 9/45558 718/1 |
| 2015/0379287 A1 | 12/2015 | Mathur et al. | |
| 2016/0065664 A1 | 3/2016 | Tung et al. | |
| 2016/0065680 A1 | 3/2016 | Harper et al. | |
| 2016/0087915 A1 | 3/2016 | Marr et al. | |
| 2016/0092271 A1* | 3/2016 | Jain | G06F 9/5011 718/1 |
| 2016/0098287 A1* | 4/2016 | Prasad | G06F 9/45558 718/1 |
| 2016/0164797 A1* | 6/2016 | Reque | G06F 9/445 718/1 |
| 2016/0378519 A1* | 12/2016 | Gaurav | G06F 9/5077 718/1 |
| 2017/0010912 A1* | 1/2017 | Perlegos | G06F 9/45558 |

OTHER PUBLICATIONS ip.com et al.; "Method for Efficient Image Distribution Over a Cloud Environment", Jan. 3, 2014.

Rad et al.; "Secure Image Processing Inside Cloud File Sharing Environment Using Lightweight Containers", 2015.

* cited by examiner

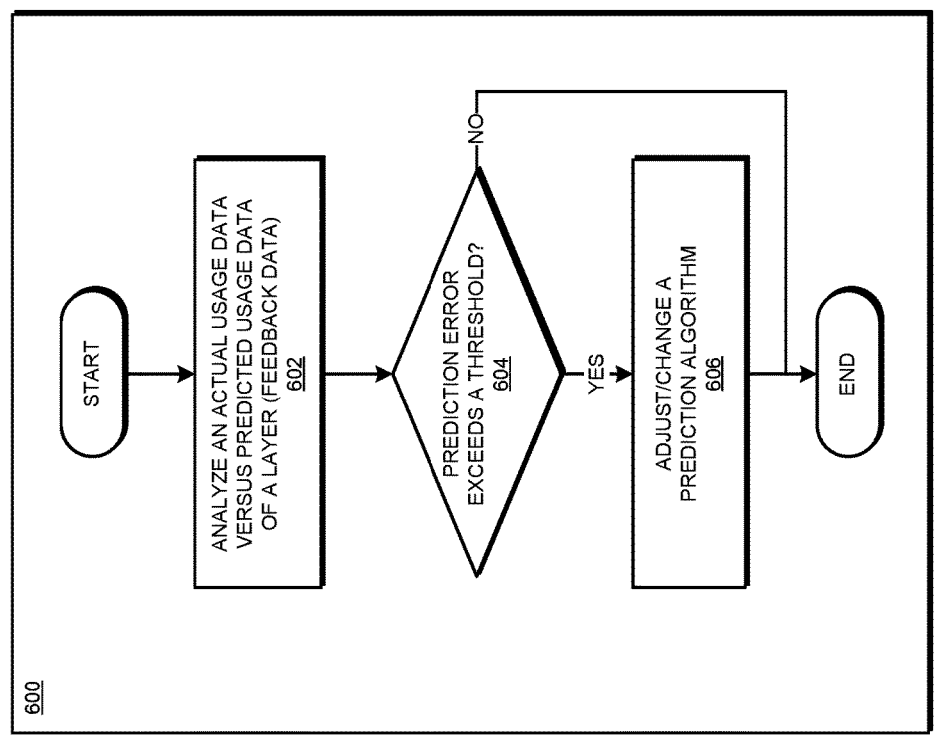

PREDICTIVE LAYER PRE-PROVISIONING IN CONTAINER-BASED VIRTUALIZATION

TECHNICAL FIELD

The present invention relates generally to a method, system, and computer program product for improving the performance of provisioning and deploying a virtualized data processing environment. More particularly, the present invention relates to a method, system, and computer program product for predictive layer pre-provisioning in container-based virtualization.

BACKGROUND

A virtual machine (VM) comprises virtualized representations of real hardware, software, and firmware components available in a data processing system. The data processing system can have any number of VMs configured thereon, and utilizing any number of virtualized components therein. The data processing system is also referred to as a computing node, a compute node, a node, or a host.

For example, the host may include a processor component. One virtual representation of the processor can be assigned to one VM, and another virtual representation of the same processor can be assigned to another VM, both VMs executing on the host. Furthermore, the second VM may also have access to a virtual representation of a reserve processor in the host and certain other resources, either exclusively or in a shared manner with the first VM.

Certain data processing systems are configured to process several workloads simultaneously. For example, separate virtual data processing systems, such as separate VMs, configured on a single host data processing system often process separate workloads for different clients or applications.

In large scale data processing environments, such as in a data center, thousands of VMs can be operating on a host at any given time, and hundreds if not thousands of such hosts may be operational in the data center at the time. A virtualized data processing environment such as the described data center is often referred to as a "cloud" that provides computing resources and computing services to several clients on an as-needed basis.

VMs are installed or created on a compute node as needed for processing workloads, meeting service level requirements, and many other reasons. Furthermore, different configurations of VMs may be needed for different purposes. For example, when a VM is created just for providing a user a general purpose computing platform, the VM may be created only with the basic operating system and no applications. In another example, when a new VM has to provide application services, the VM may be created with an operating system and an application server configured thereon. Similarly, many different configurations of VMs may be created for a variety of other purposes.

An image is a binary package that can be installed on a hardware to instantiate a VM on the hardware. A layer is a software package that participates in an image. An image can include any number of software packages, whose layers are assembled together in the image as a monolithic binary. A single image can, but need not necessarily, represent an application.

A commonly used method of virtualization—traditional virtualization—preconfigures various VM configurations as template images (templates). When a VM having a specific predetermined configuration has to be created on a compute node, a suitable template is selected from a template storage, such as a database or a file-system, and installed on the compute node to create a VM having the desired configuration. An image of a VM in traditional virtualization is a monolithic binary image.

Another method for virtualization is container-based virtualization. Container-based virtualization, also called operating system virtualization, is an approach to virtualization in which the virtualization layer runs as an application within the operating system. In this approach, the operating system's kernel runs on the hardware node with several isolated application environments installed on top of it. The isolated guest application environments are called containers. In other words, a container is a running instance of an image of a VM in which the layers are distinguishable from one another.

Container-based virtualization is a way to operate several VMs on the same host, where the VMs share the same kernel and memory space among themselves and with the host. The isolation between the containers occurs at multiple resources, such as at the file-system, the network stack subsystem, and one or more namespaces, but not limited thereto. By sharing the same running kernel and memory space there is virtually no difference between the performance of the "host" operating system and the containers.

This method of virtualization is significantly different from the traditional virtualization technology where the hardware is emulated using a software emulation layer, which causes provisioning latencies, slow startup times, and decreased performance of the underlying hardware. These and other drawbacks of the traditional virtualization method are due to the software emulation layer that sits between the physical hardware of the host and the operating system that is being run on top of the emulated hardware.

Generally, a container is an image formed using a set of one or more layers. For example, a container may include one layer for modifying the operating system to a specific version or specific customization—e.g., apply Ubuntu™ 14.04 binary to the underlying Linux® operating system (Ubuntu is a trademark of Canonical Ltd. in the United States and in other countries. Linux is a trademark of Linus Torvalds in the United States and other countries); another layer might include configuration data for the operating system customization—e.g., Ubuntu configuration; another layer might apply or remove updates to the modified operating system—e.g., apply Ubuntu system updates; another layer might include an application to be configured in the container—e.g., the binaries of an application server; another layer might include the configuration data of the application server; another layer might include the binary or other data of a user application that is to be executed using the container; another layer might include a set of environment variables that is needed to successfully operate the application server, the user application, or both on the container; and so on. Many different types of layers can be similarly configured in a container image, and any number of layers can be configured in a container image to create a container.

The container-based virtualization technology offers higher performance and less resource footprint when compared to traditional virtualization, and has become an attractive way for cloud vendors to achieve higher density in the datacenter. Thus, containerization (i.e., operating a virtualized data processing environment using container-based virtualization) is changing how workloads are being provisioned on cloud infrastructure.

Containers offer many advantages, but the illustrative embodiments recognize that significant hurdles exist in making container-based virtualization technology prepared to handle enterprise-type workloads. One such hurdle is around image management and initial provisioning time latency. Due to the layered nature of container images, traditional approaches to image management and workload placement are insufficient to optimize container-based workloads.

Provisioning is the process of providing a resource to a configuration. Specifically, in deploying containers on host machines in a data processing environment, provisioning a container refers to the process of providing the container image—i.e., providing the layers comprising the container image—over a data network from a repository of layers or images to a selected host machine in the data processing environment where the container is to be created and operated.

When containers are provisioned in a data processing environment where traditional placement techniques are used for the provisioning, under certain circumstances, container provisioning can experience latency that is excessive, e.g., higher than the expected latency of a preset performance metric, due to on-demand download of container layers. The illustrative embodiments overcome this and other drawbacks of provisioning containerized images in a data processing environment.

In the above example of Ubuntu, application server, and user application layers, the aggregation of those layers makes up the container image. When the container image is built, each build time action generates a new layer which leverages functionality from the layers beneath. Each layer is assigned a unique identifier at build time. When request is made for a container to be started on a given host, the host verifies that each layer's unique identifier is present on local storage before the host completes the request. If a particular layer identifier is not present, that layer is downloaded from a source location prior to starting the container.

A layer can be large and the downloading of the layer can result in slow provisioning time and high latency depending on network conditions. The illustrative embodiments recognize that generally, a significant part of the start-up latency in container-based virtualization is due to the downloading of layers, and particularly the larger-than-a-threshold-size layers. Presently available methods determine the layers that are missing from a local cache of a host and download only those layers that are missing in the local cache. The illustrative embodiments recognize that issues still exist, and cause unacceptable start-up latency when the largest layer, or layers exceeding a certain threshold size, are not present in the local cache. The illustrative embodiments minimize or reduce the download latency—particularly when one or more layers exceeding a certain threshold size have to be downloaded, thereby improving the provisioning and deployment efficiency of containers in a data processing environment.

SUMMARY

The illustrative embodiments provide a method, system, and computer program product. An embodiment includes a method that computes, using a metadata of a layer, a prediction factor comprising a level of participation of the layer in a set of container images, each container image in the set of container images comprising a corresponding set of layers and being usable to configure a container in a container-based virtualized data processing environment.

The embodiment predicts, using a set of levels of participation corresponding to a set of layers, and using a condition in a prediction algorithm, a subset of layers that have to be pre-provisioned at a node. The embodiment adjusts the subset of layers to form an adjusted subset of layers, by looking ahead at a container requirement of a workload that is planned for processing at a future time. The embodiment causes the adjusted subset of layers to be provisioned on the node prior to the future time. Thus, the embodiment improves the performance of container-based virtualization in data processing environments by reducing or removing the download latency caused by downloading of certain missing layers.

An embodiment further adjusts the adjusted subset of layers to form a second adjusted subset of layers, by removing a second layer from the adjusted subset, the second layer being likely to be already provisioned on the node at the future time. Thus, the embodiment improves the performance of container-based virtualization in data processing environments by judiciously removing certain layers that are expected to be pre-provisioned at the host as a result of other operations.

An embodiment further adjusts the adjusted subset of layers to form a second adjusted subset of layers, by adding a second layer to the adjusted subset, the second layer being likely to be needed on the node due to the workload at the future time. Thus, the embodiment improves the performance of container-based virtualization in data processing environments by judiciously adding certain layers that are expected to be needed at the host as a result of a workload.

In one embodiment, the node is identified by only a node type. Thus, the embodiment improves the performance of container-based virtualization in data processing environments by pre-provisioning layers, not at a specific node, but at one or more nodes of a certain type, any of which could be used for the container. at the host as a result of other operations.

An embodiment further selects from the set of levels a subset of levels, each level in the subset of levels exceeding a threshold level of participation. The embodiment selects the subset of layers corresponding to the selected subset of levels. Thus, the embodiment improves the performance of container-based virtualization in data processing environments by judiciously pre-provisioning those layers whose participation in the containers is significant.

An embodiment further computes a second prediction factor comprising a frequency at which a second layer is requested for configuring the container. The embodiment includes, responsive to the frequency exceeding a threshold frequency, the second layer in the subset of layers. Thus, the embodiment improves the performance of container-based virtualization in data processing environments by judiciously pre-provisioning those layers that are called upon with a significant frequency for use in containers.

An embodiment further determines, as a second prediction factor, whether the layer depends on a second layer for configuring the container. The embodiment includes, responsive to the layer depending on the second layer, the second layer in the subset of layers. Thus, the embodiment improves the performance of container-based virtualization in data processing environments by judiciously pre-provisioning those layers that have a dependency relationship other layers.

An embodiment further determines, as a second prediction factor, a size of a second layer. The embodiment includes, responsive to the size of the second layer exceeding a threshold size, the second layer in the subset of layers.

Thus, the embodiment improves the performance of container-based virtualization in data processing environments by judiciously pre-provisioning those layers that are of significant sizes, which could otherwise cause an unacceptable download latency.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a flowchart of an example process for using feedback data in accordance with an illustrative embodiment.

DETAILED DESCRIPTION

Figure 1:
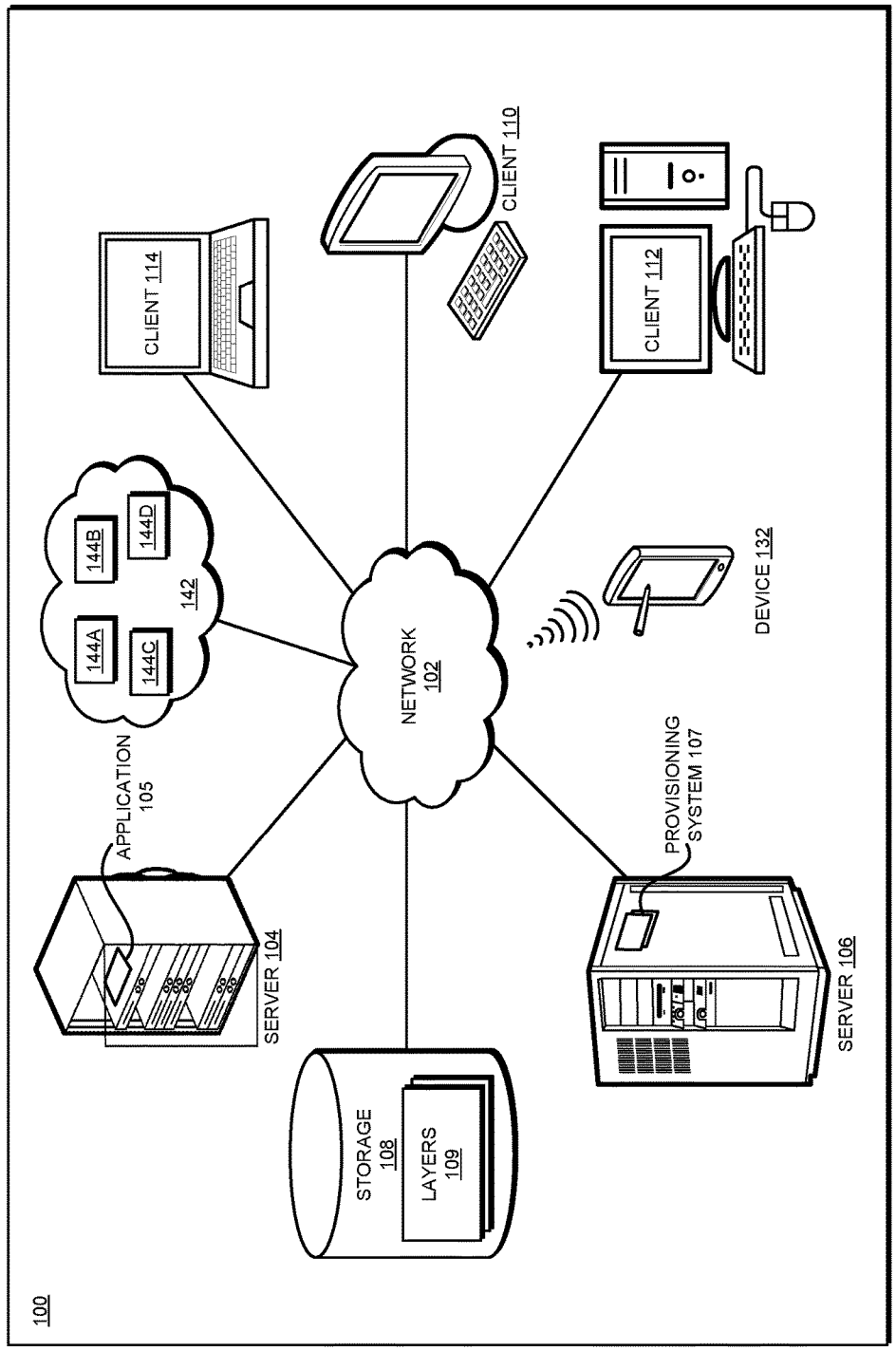
FIG. 1 depicts a block diagram of a network of data processing systems in which illustrative embodiments may be implemented.

The illustrative embodiments used to describe the invention generally address and solve the above-described problems and other problems related to provisioning containers in a virtualized data processing environment.

An embodiment can be implemented as a software application. The application implementing an embodiment can be configured as a modification of an existing provisioning system, as a separate application that operates in conjunction with an existing provisioning system, a standalone application, or some combination thereof.

An embodiment predicts which layers are likely to be needed at which host in the data processing environment. The prediction applies to one or more conditions that are likely to exist at the host. One non-limiting example of the conditions is a period during which a certain type of workload is expected to be sent to the host for which a container will likely have to be configured at the host during the period. Because different workloads can be processed on the same host at different times, different containers to process those different workloads may be configured on the same host at different times, thereby requiring different predicted sets of layers on the host at different times.

Another non-limiting example of the conditions is other containers that are likely to be configured on the host. Depending on the period for which the prediction is being made, the host may already be configured with other containers, some of which might share one or more layers with the predicted layers, thereby obviating the need to download the already existing shared layers.

Another non-limiting example of the conditions is other workloads that are likely to be processed on the host. Depending on the period for which the prediction is being made, the host may already be configured with other containers for such other workloads, some of which might share one or more layers with the predicted layers, thereby obviating the need to download the already existing shared layers.

Another non-limiting example of the conditions is the availability of the host or other hosts during a period or for an expected workload. Depending on the expected workload, different hosts may be available at different times depending on the time at which the expected workload is scheduled for processing. One host might need one set of predicted layers at one time whereas another host might need a different predicted set of layers at a different time for the same workload.

Another non-limiting example of the conditions is a level of access or security associated with an expected workload, a user of the workload, a host machine, a container, or a combination thereof. Different access level permissions for one or more of these factors may cause different sets of layers to be predicted for executing the workload. For example, under one circumstance, a workload may only have an access level that is sufficient to use 128-bit encryption layer, such as for export purposes, whereas, the same workload may have a different access level that is sufficient to use 4096-bit encryption layer, such as for domestic purposes. Accordingly, different values of the access level condition can cause different layers to be predicted.

Another non-limiting example of the conditions is a licensed product to be used with an expected workload, a user of the workload, a host machine, a container, or a combination thereof. Different types of licenses, different availability of the licenses, or both, may cause different sets of layers to be predicted for executing the workload. For example, under one circumstance, a workload may only need to use a developer license for a license management layer, such as for testing purposes, whereas, the same workload may have to use a full featured production license for the license management layer, such as for production use purposes. Similarly, a license for one licensed product may be unavailable at a predicted time of the workload causing a change of a software layer to a layer corresponding to a different comparable product whose license is expected to be available at the time. Accordingly, different values of the licensing condition can cause different layers to be predicted.

These examples of conditions governing the layer predictions are not intended to be limiting. From this disclosure, those of ordinary skill in the art will be able to conceive many other conditions that affect the layer prediction and the same are contemplated within the scope of the illustrative embodiments.

To make a prediction, an embodiment further evaluates a usage, participation, or popularity of a layer in the various container images. For example, some layers may be used frequently, i.e., may be popular or may participate, in numerous container images, whereas some other layers may be used relatively sparingly under specific circumstances. As an example, a layer to configure an application server on a container may be more popular than a layer to configure a financial auditing tool on the container. In other words, a significantly larger number of container images may use a more popular layer as compared to a number of container images that use a less popular layer.

An embodiment uses the level of participation of a layer as a factor in predicting whether the layer is likely to be needed by a host to configure a container during a period. A level of participation of a layer in various container images can be determined from analyzing the images, analyzing the layer metadata, analyzing a frequency of requests for the layer from a configurator of containers, or some combination of these and other analyses.

An embodiment uses a dependency of a layer as a factor in predicting whether the layer is likely to be needed by a host to configure a container during a period. For example, a layer for a software product may be dependent upon another layer for configuring that product. Accordingly, if the layer for the product is predicted to be needed, that prediction increases the likelihood that the layer for configuring the product will also be needed, and vice versa. A dependency of a layer can be determined from analyzing the images, analyzing the layer metadata, analyzing a frequency of requests for combinations of layers from a configurator of containers, or some combination of these and other analyses.

An embodiment uses a size of a layer as a factor in predicting whether the layer is likely to be needed by a host to configure a container during a period. For example, it may be that in the given data processing environment, unusually large layers usually belong to custom products or custom container configurations, thereby indicating sparse usage of such layers. As another example, it may be that in the given data processing environment bare metal hosts are used extensively, and unusually large layers usually configure the operating system for containers, thereby indicating heavy usage of such layers. Different size related factors may imply different likelihoods of usage of layers of various sizes. A size-related factor of a layer can be determined from analyzing the images, analyzing the layer metadata, analyzing a frequency of requests for the layer from a configurator of containers, or some combination of these and other analyses.

The historical usage of specific layers in container images, historical requests for specific layers, and other similarly purposed data can be stored and made available from a historical data repository. An embodiment uses the historical data to evaluate one or more factors for use in a prediction algorithm to predict a need for a set of layers in a manner described herein.

These examples of factors on which a prediction is based are not intended to be limiting. From this disclosure, those of ordinary skill in the art will be able to conceive many other factors for predicting layer needs, and the same are contemplated within the scope of the illustrative embodiments.

Once a set of layers is predicted for use during a period, an embodiment further adjusts the prediction by performing a look-ahead. Specifically, if the prediction is for a period, there may already be workloads planned for the period. Such workload planning is not necessary, but is often available in cloud data processing environments. If workload planning is available for a prediction period, the embodiment looks ahead into the planning and analyzes a workload that is planned during the period.

Based on the analysis, the embodiment determines a host where the workload is likely to be processed. Upon identifying the host, and using one or more factors and/or conditions as described herein, the embodiment determines an actual availability of layers on that host that is likely to exist during the period. The embodiment changes the prediction for the host for the period by removing from provisioning a layer that may not be needed for the planned workload, removing from provisioning a layer that may be already available at the host, adding to the provision a layer that may be needed for the planned workload and is expected to be unavailable at the host, or some combination of these and other similarly purposed adjustments.

Feedback data includes information about actual layers used at a host during various periods. Past layer predictions for the host are also stored and available in a repository. An embodiment further adjusts or changes a prediction algorithm to improve the accuracy of the prediction. Specifically, the embodiment compares past predictions of layer needs—using which layers were pre-provisioned at certain hosts—and actual layers that were needed at those hosts to successfully operate one of more containers during one or more past periods. Using such a comparison, the embodiment computes a prediction error, which is the difference between the layers predicted and the layers actually used. Using the prediction error, the embodiment adjusts a prediction algorithm, or replaces the algorithm with a different algorithm, to reduce the prediction error during a future period.

Thus, a layer prediction is generated by an embodiment for pre-provisioning a set of layers at a host for a period—i.e. provisioning the predicted layers at the host prior to the prediction period. Optionally, the prediction is adjusted through look-ahead, feedback data, or both.

Once a prediction or an adjusted prediction is computed by one or more embodiments, as the case may be, an embodiment performs a placement function. In the placement function, the embodiment prepares a predictive provisioning instruction. The predictive provisioning instruction is an instruction or command that is recognized by a provisioning system in a data processing environment. More particularly, the predictive provisioning instruction from an embodiment is an instruction to the provisioning system to pre-provision a set of layers identified in the instruction, to a host identified in the instruction, prior to a period identified in the instruction.

The instruction causes the provisioning system to configure and/or send a container image with the set of layers for the host, configure and/or initiate a transmission of the set of layers to the host, configure and/or initiate a download of the set of layers at the host, or otherwise provide the set of layers to the host prior to the period. Thus, the pre-provisioning according to the illustrative embodiments causes the download latency to be reduced or eliminated as the layers that are expected to be needed at the host during the period will have been made available at the host prior to the period, and the expected containers can be configured with those available layers.

A method of an embodiment described herein, when implemented to execute on a device or data processing system, comprises substantial advancement of the functionality of that device or data processing system in provisioning containers on host machines in a data processing environment. For example, presently available methods for provisioning a container for container-based virtualization requires the host to download a needed layer on-demand at the time of configuring the container. This on-demand download creates a delay in configuring and starting the container on the host machine. An embodiment provides a method for predicting a set of layers that are likely to be needed at a host machine during a future period. An embodiment further adjusts the predicted set of layers using look-ahead into workload planning and feedback data from past container executions. An embodiment causes the predicted or predicted-adjusted set of layers to be pre-provisioned at the host machine so that the download delay is reduced or eliminated for starting the expected containers during the period. This manner of predictive layer pre-provisioning in container-based virtualization is unavailable in the presently available methods. Thus, a substantial advancement of such devices or data processing systems by executing a method of an embodiment is in improved performance of container-based virtualization in data processing environments.

The illustrative embodiments are described with respect to certain types of containers, layers, layers metadata, hosts, periods, conditions, factors, predictions, likelihoods, adjustments, feedback data, historical data, workload planning data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
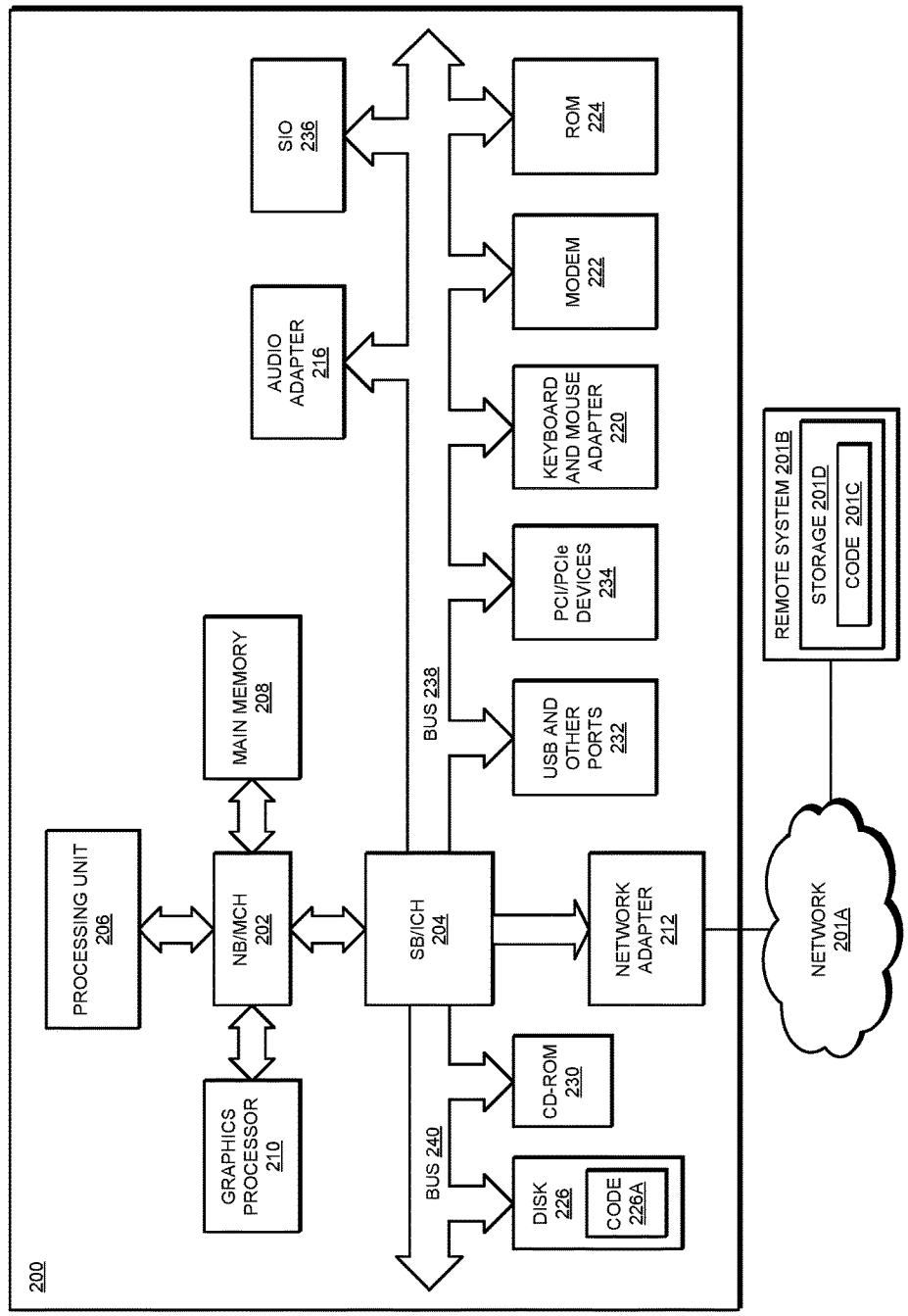
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Provisioning system 107 provisions layers for deploying containers on one or more hosts in managed data processing environment 142, such as hosts 144A, 144B, 144C, and 144D. layers 109 is a collection of layers in repository 108, from which provisioning system 107 can provision a layer to a host, e.g., to host 144A, in data processing environment 142. Each layer in layers 109 has associated metadata (not shown). The layer metadata of a layer includes, but is not limited to, information about the container images in which the layer participates, and other information usable in determining a prediction factor in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
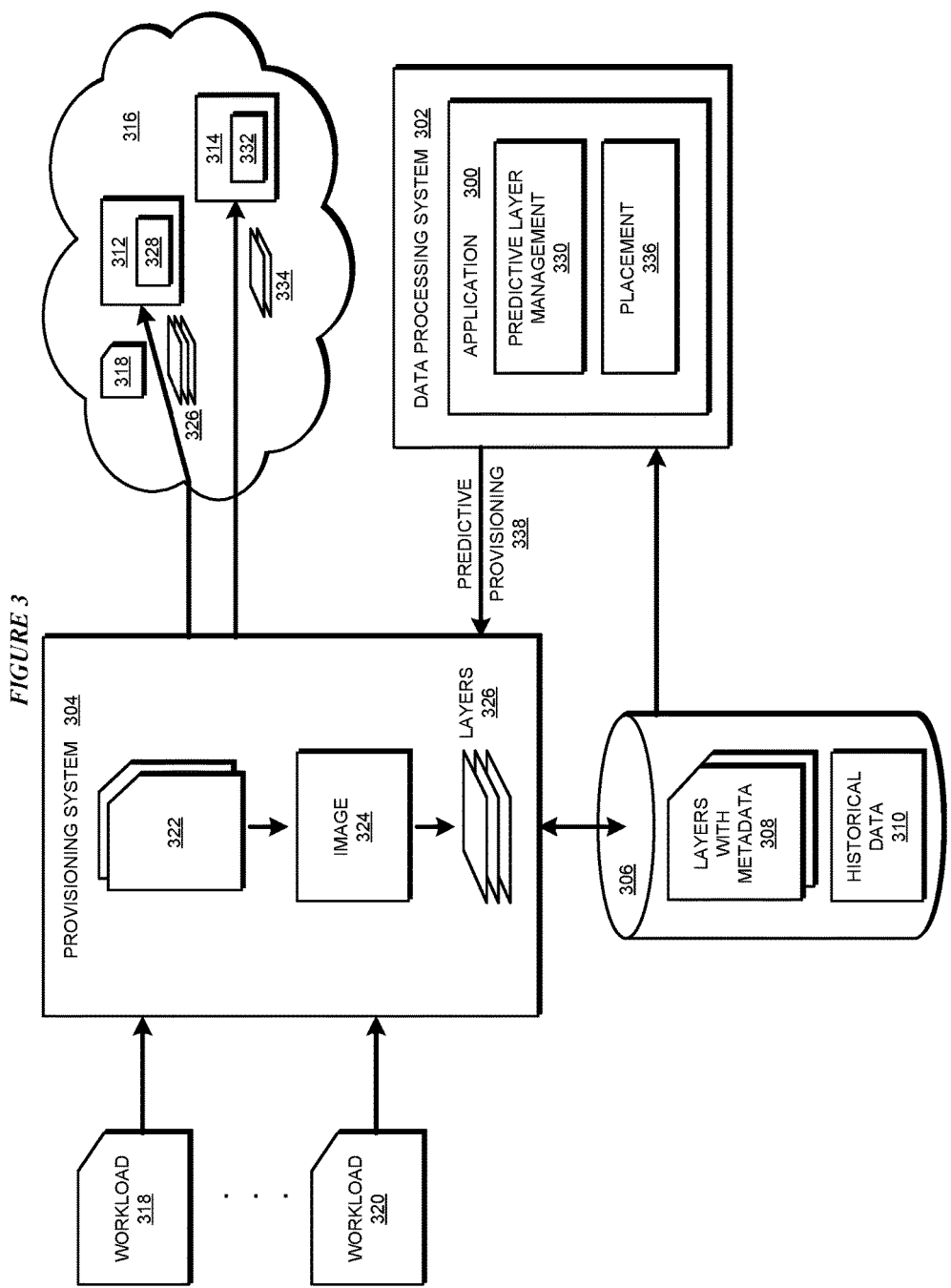
FIG. 3 depicts a block diagram of an example configuration for predictive layer pre-provisioning in container-based virtualization in accordance with an illustrative embodiment.

With reference to FIG. 3, this figure depicts a block diagram of an example configuration for predictive layer pre-provisioning in container-based virtualization in accordance with an illustrative embodiment. Application 300 is an example of application 105 in FIG. 1. Provisioning system 304 is an example of provisioning system 107 in FIG. 1. Repository 306 is an example of repository 108 in FIG. 1.

Repository 306 includes set 308 of layers, which is similar to layers 109 in FIG. 1. Only as a non-limiting example, suppose that repository 306 (or another repository—not shown) stores and provides historical data 310 as described herein.

Two different scenarios of operations are described with respect to this figure. One scenario configured a container using a presently used traditional virtualization method that requires on-demand downloading of layers and incurs a download delay or latency. The other scenario configures a container using one or more embodiments described herein and reduces or eliminates the download latency. The two scenarios are described concurrently in the description of this figure only to comparatively illustrate the distinctions and advantages associated with the illustrative embodiments. The two scenarios can, but need not necessarily occur concurrently in a data processing environment to practice an embodiment.

Provisioning system 304 provisions layers to hosts 312 and 314 in data processing environment 316. For example, suppose that users or processes in some data processing systems provide workloads for execution using containers in environment 316. Workloads 318-320 are examples of such workloads, which are planned for execution in environment 316.

Provisioning system 304 or a system (not shown) operating in conjunction with provisioning system 304 queues or otherwise plans workloads 318-320 for processing. Workload plan 322 is an example of such a plan.

Presently, provisioning system 304 selects a planned workload, e.g., workload 318 from plan 322, selects a container image, e.g., image 324, selects the layers that participate in image 324, e.g., layers 326, and provisions layers 326 on a host, e.g., on host 312. Host 312 downloads images 326 from set 308 in repository 306, incurring a downloading latency in starting container 328 at host 312, and eventually starting container 328 to process workload 318.

In accordance with an embodiment, component 330 in application 300 predicts a set of layers that will likely be used at host 314 at a future time. Component 330 further adjusts the predicted set of layers for host 314 for the future time based on a look-ahead as described herein. As a non-limiting example, suppose that component 330 analyzes plan 322 and predicts that workload 320 will likely be executed at the future time using a container on host 314. Suppose that container 332 is such a container that is to be configured and started at the future time for processing workload 320.

Component 330 determines the configuration of container 332 and adjusts the predicted set of layers to ensure that the adjusted set of layers will be available on host 314 at the future time to configure container 332 without having to download a layer that container 332 will need. Adjusted set 334 of layers is such an adjusted set of layers.

Placement component 336 of application 300 constructs predictive provisioning instruction 338 and sends to provisioning system 304. Provisioning system 304 pre-provisions adjusted set 334 of layers on host 314 for the future time. Host 314 downloads adjusted set 334 from repository 306 prior to the future time.

At the future time, workload 320 is sent to host 314 for processing. Host 314 uses the pre-downloaded adjusted set 334 of layers to configure container 332 and process workload 320 without incurring an amount of download latency as was the case with configuring container 328 on host 312.

Figure 4:
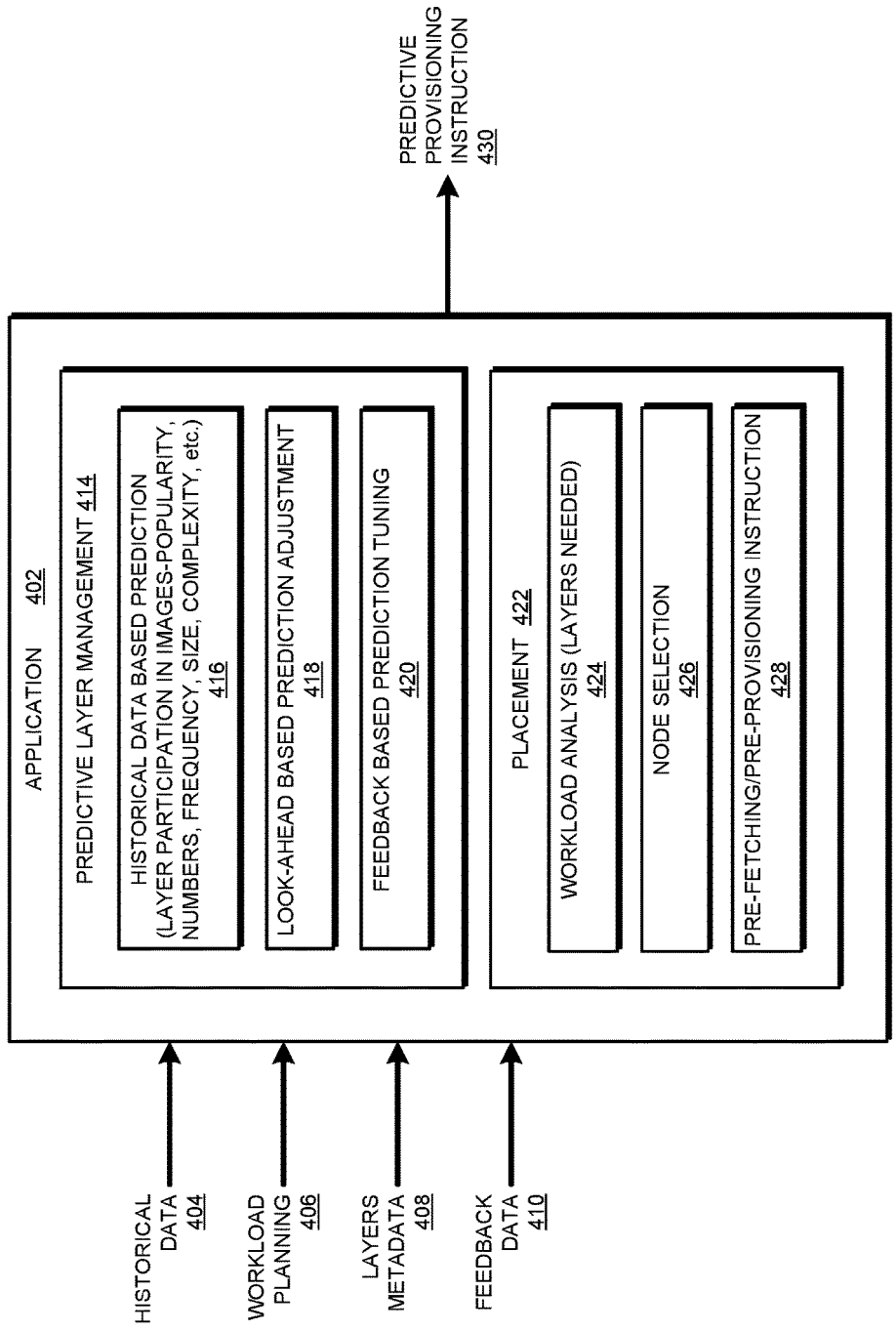
FIG. 4 depicts a block diagram of an application for predictive layer pre-provisioning in container-based virtualization in accordance with an illustrative embodiment.

With reference to FIG. 4, this figure depicts a block diagram of an application for predictive layer pre-provisioning in container-based virtualization in accordance with an illustrative embodiment. Application 402 is an example of application 300 in FIG. 3.

Application 402 receives historical data input 404, workload planning data 406, layers metadata 408, and feedback data 410, as described herein. Not all inputs are necessary and at least some embodiments can operate with only layers metadata 408.

Component 414, which is an example of component 330 in FIG. 3, performs the prediction operation. Specifically, subcomponent 416 uses layers metadata 408 to predict a set of layers that are likely to be needed at a host at a future time. When historical data 404 is available, subcomponent 416 uses historical data 404 in addition to layers metadata 408 to predict the set of layers that are likely to be needed at the host at the future time. Subcomponent 418 adjusts the predicted set based on a look-ahead using workload data 406. Subcomponent 420 uses feedback data 410 to tune or adjust the prediction algorithm for future predictions in a manner described herein.

Component 422, which is an example of component 336 in FIG. 3, constructs and sends the predictive provisioning instruction. Specifically, subcomponent 424 analyzes the specific layers expected for a particular planned workload. Component 426 selects a node on which the planned workload is likely to be executed. Component 426 determines the layers that can be expected to be available on the selected host at the future time of the likely execution of the planned workload.

Subcomponent 428 constructs and sends to a provisioning system, such as to provisioning system 304 in FIG. 3, pre-provisioning instruction 430. Instruction 430 causes the provisioning system to pre-provision those layers that are likely to be unavailable on the host but are needed for operating a container on the selected host for the likely processing of the planned workload at the future time.

Figure 5:
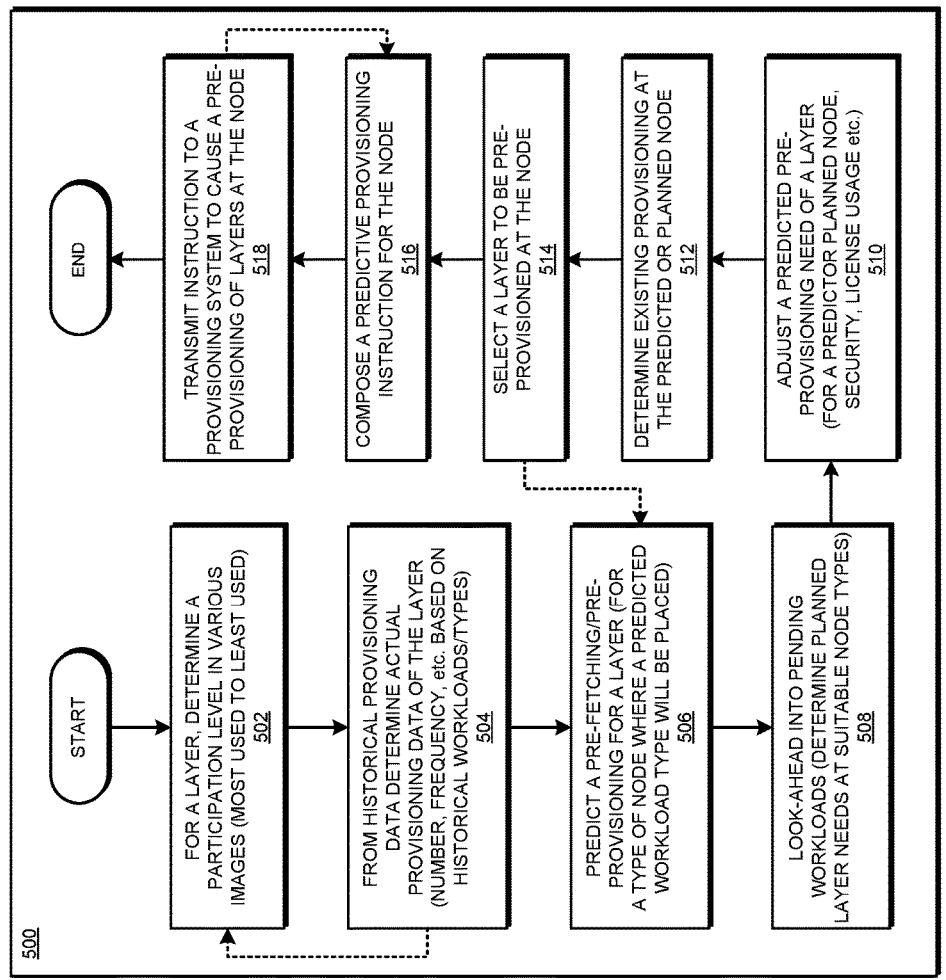
FIG. 5 depicts a flowchart of an example process for predictive layer pre-provisioning in container-based virtualization in accordance with an illustrative embodiment.

With reference to FIG. 5, this figure depicts a flowchart of an example process for predictive layer pre-provisioning in container-based virtualization in accordance with an illustrative embodiment. Process 500 can be implemented in application 402 in FIG. 4.

The application determines a participation level of a layer in the various container images being utilized in a data processing environment (block 502). The application uses historical data to determine an actual number of time the layer has been provisioned, the frequency at which the layer has been provisioned, and other factors of prediction as described herein (block 504). The application repeats block 502-504 for as many layers as needed. Block 504 may be optional in some cases.

The application predicts a set of layers that should be pre-provisioned for a node or a type of node (block 506). The prediction is subject to one or more conditions as described herein, and uses one or more factors including, but not limited to, a predicted workload or workload type for that node or node type, in a manner described herein.

The application looks-ahead into planned workloads (block 508). The application adjusts the predicted set of layers to add or remove a layer from the set according to the predicted layers that may be used for a planned workload on a predicted node or node type for the planned workload (block 510).

The application determines the provisioning that may already exist at the node or node type at the future time of processing of the planned workload on the node or node type (block 512). The application selects from the adjusted predicted set of layers a layer that is expected to be missing from the node or node type at the future time (block 514). The application repeats all or some of the blocks to select one or more missing layers, for one or more nodes or node types, for one or more planned workloads, for one or more future times.

For a node or node type, for a future time, the application constructs a predictive provisioning instruction in a manner described herein (block 516). The application transmits the instruction to a provisioning system to cause the pre-provisioning of certain layers at the node or node type (block 518). The application repeats blocks 516 and 518 for as many instructions as may be needed for the various nodes or node types, future times, and planned workloads. The application ends process 500 thereafter.

With reference to FIG. 6, this figure depicts a flowchart of an example process for using feedback data in accordance with an illustrative embodiment. Process 600 can be implemented in application 402 in FIG. 4.

The application actual layer usage data versus the predicted layer usage data from feedback data in a manner described herein (block 602). The application computes a prediction error from the feedback data and determines whether the error exceeds a threshold amount of error (block 604). If the prediction error does not exceed the threshold error ("No" path of block 604), the application ends process 600 thereafter. If the prediction error exceeds the threshold error ("Yes" path of block 604), the application adjusts, changes, or replaces a prediction algorithm (block 606). The application ends process 600 thereafter.

Thus, a computer implemented method, system or apparatus, and computer program product are provided in the illustrative embodiments for predictive layer pre-provisioning in container-based virtualization and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   computing, using a metadata of a layer, a prediction factor comprising a level of participation of the layer in a set of container images, each container image in the set of container images comprising a corresponding set of layers and being usable to configure a container in a container-based virtualized data processing environment;
   predicting, using a set of levels of participation corresponding to a set of layers, and using a condition in a prediction algorithm, a subset of layers that have to be pre-provisioned at a node;
   adjusting the subset of layers to form an adjusted subset of layers, by looking ahead at a container requirement of a workload that is planned for processing at a future time; and
   causing the adjusted subset of layers to be provisioned on the node prior to the future time.

2. The method of claim 1, further comprising:
   further adjusting the adjusted subset of layers to form a second adjusted subset of layers, by removing a second layer from the adjusted subset, the second layer being likely to be already provisioned on the node at the future time.

3. The method of claim 1, further comprising:
further adjusting the adjusted subset of layers to form a second adjusted subset of layers, by adding a second layer to the adjusted subset, the second layer being likely to be needed on the node due to the workload at the future time.

4. The method of claim 1, wherein the node is identified by only a node type.

5. The method of claim 1, further comprising:
selecting from the set of levels a subset of levels, each level in the subset of levels exceeding a threshold level of participation; and
selecting the subset of layers corresponding to the selected subset of levels.

6. The method of claim 1, further comprising:
computing a second prediction factor comprising a frequency at which a second layer is requested for configuring the container; and
including, responsive to the frequency exceeding a threshold frequency, the second layer in the subset of layers.

7. The method of claim 1, further comprising:
determining, as a second prediction factor, whether the layer depends on a second layer for configuring the container; and
including, responsive to the layer depending on the second layer, the second layer in the subset of layers.

8. The method of claim 1, further comprising:
determining, as a second prediction factor, a size of a second layer; and
including, responsive to the size of the second layer exceeding a threshold size, the second layer in the subset of layers.

9. The method of claim 1, wherein the condition comprises a type of a workload that is likely to be sent to the host.

10. The method of claim 1, wherein the condition comprises a type of a workload that is likely to be sent to the host at the future time.

11. The method of claim 1, wherein the condition comprises another container that is likely to be configured on the host at the future time.

12. The method of claim 1, wherein the condition comprises another workload that is likely to be processed on the host at the future time.

13. The method of claim 1, wherein the condition comprises an availability of another node where the workload can be processed at the future time.

14. The method of claim 1, wherein the condition comprises a level of access associated with at least one of (i) the workload, (ii) the node, and (iii) the container.

15. The method of claim 1, wherein the condition comprises an availability of a license to a software product to process the workload at the future time.

16. The method of claim 1, wherein the metadata of the layer include information identifying each container image from the set of container images in which the layer is participating.

17. The method of claim 1, further comprising:
constructing an instruction, the instruction specifying the adjusted subset of layers, the node;
sending the instruction to a provisioning system, the sending causing the provisioning prior to the future time.

18. The method of claim 17, wherein the instruction further specifies the future time.

19. A computer usable program product comprising a computer-readable storage medium, and program instructions stored on the computer-readable storage medium, the stored program instructions comprising:
program instructions to compute, using a metadata of a layer, a prediction factor comprising a level of participation of the layer in a set of container images, each container image in the set of container images comprising a corresponding set of layers and being usable to configure a container in a container-based virtualized data processing environment;
program instructions to predict, using a set of levels of participation corresponding to a set of layers, and using a condition in a prediction algorithm, a subset of layers that have to be pre-provisioned at a node;
program instructions to adjust the subset of layers to form an adjusted subset of layers, by looking ahead at a container requirement of a workload that is planned for processing at a future time; and
program instructions to cause the adjusted subset of layers to be provisioned on the node prior to the future time.

20. The computer usable program product of claim 19, further comprising:
program instructions to further adjust the adjusted subset of layers to form a second adjusted subset of layers, by removing a second layer from the adjusted subset, the second layer being likely to be already provisioned on the node at the future time.

21. The computer usable program product of claim 19, further comprising:
program instructions to further adjust the adjusted subset of layers to form a second adjusted subset of layers, by adding a second layer to the adjusted subset, the second layer being likely to be needed on the node due to the workload at the future time.

22. The computer usable program product of claim 19, wherein the node is identified by only a node type.

23. The computer usable program product of claim 19, wherein the computer usable code is stored in a computer readable storage device in a data processing system, and wherein the computer usable code is transferred over a network from a remote data processing system.

24. The computer usable program product of claim 19, wherein the computer usable code is stored in a computer readable storage device in a server data processing system, and wherein the computer usable code is downloaded over a network to a remote data processing system for use in a computer readable storage device associated with the remote data processing system.

25. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to compute, using a metadata of a layer, a prediction factor comprising a level of participation of the layer in a set of container images, each container image in the set of container images comprising a corresponding set of layers and being usable to configure a container in a container-based virtualized data processing environment;
program instructions to predict, using a set of levels of participation corresponding to a set of layers, and using a condition in a prediction algorithm, a subset of layers that have to be pre-provisioned at a node;
program instructions to adjust the subset of layers to form an adjusted subset of layers, by looking ahead at a container requirement of a workload that is planned for processing at a future time; and program instructions to cause the adjusted subset of layers to be provisioned on the node prior to the future time.

* * * * *